(12) United States Patent
Kircher et al.

(10) Patent No.: US 8,036,989 B2
(45) Date of Patent: Oct. 11, 2011

(54) TRANSMISSION OF MESSAGES RELATED TO ELECTRONIC DOCUMENTS

(75) Inventors: Stefan Kircher, Wiesloch (DE); Michael Dauscher, Pfungstadt (DE)

(73) Assignee: SAP Aktiengesellschaft, Walldorf (DE)

( * ) Notice: Subject to any disclaimer, the term of this patent is extended or adjusted under 35 U.S.C. 154(b) by 12 days.

(21) Appl. No.: 12/627,405

(22) Filed: Nov. 30, 2009

(65) Prior Publication Data

US 2010/0077348 A1    Mar. 25, 2010

Related U.S. Application Data

(62) Division of application No. 11/119,512, filed on Apr. 29, 2005, now abandoned.

(51) Int. Cl.
  *G06F 3/048*    (2006.01)
(52) U.S. Cl. ............................ 705/51; 715/803; 715/810
(58) Field of Classification Search ................... 705/51; 718/803
  See application file for complete search history.

(56) References Cited

U.S. PATENT DOCUMENTS

| | | | |
|---|---|---|---|
| 6,952,660 B1 * | 10/2005 | Matheson | 703/1 |
| 7,080,099 B2 * | 7/2006 | Tada et al. | 707/771 |
| 7,305,381 B1 * | 12/2007 | Poppink et al. | 1/1 |
| 7,386,535 B1 * | 6/2008 | Kalucha et al. | 1/1 |
| 2002/0042838 A1 * | 4/2002 | Tabayoyon et al. | 709/237 |
| 2002/0174010 A1 * | 11/2002 | Rice, III | 705/14 |
| 2003/0135565 A1 * | 7/2003 | Estrada | 709/206 |
| 2004/0177159 A1 * | 9/2004 | Butterfield et al. | 709/246 |
| 2004/0186762 A1 * | 9/2004 | Beaven et al. | 705/8 |
| 2004/0267871 A1 * | 12/2004 | Pratley et al. | 709/200 |
| 2005/0068980 A1 * | 3/2005 | Mathew et al. | 370/464 |
| 2005/0223060 A1 * | 10/2005 | Lueckhoff | 709/206 |
| 2006/0053380 A1 * | 3/2006 | Spataro et al. | 715/753 |

* cited by examiner

*Primary Examiner* — Andrew J. Fischer
*Assistant Examiner* — C. Aaron McIntyre
(74) *Attorney, Agent, or Firm* — Fish & Richardson P.C.

(57) ABSTRACT

One implementation provides a computer program product tangibly embodied in an information carrier. The computer program product includes instructions that, when executed, perform a method for processing a message related to an electronic document. The method includes transmitting an electronic document having a unique identifier from a first system to a second system and receiving at the first system a message from the second system related to content contained in the electronic document. The message includes a predetermined field for the unique identifier that links the message to the electronic document. The method may also include notifying a user of the first system that the first system received the message. The notifying may include updating a list of tasks. One of the tasks may indicate that the user may view the received message on the first system.

14 Claims, 5 Drawing Sheets

TRANSMISSION OF MESSAGES RELATED TO ELECTRONIC DOCUMENTS

CROSS-REFERENCE TO RELATED APPLICATIONS

This application is a divisional and claims the benefit of priority of U.S. application Ser. No. 11/119,512, filed Apr. 29, 2005. The disclosure of this prior application is incorporated by reference herein.

TECHNICAL FIELD

This application relates to transmitting messages related to electronic documents.

BACKGROUND

Companies and their business partners often use digital communications to complete business transactions. Some digital communication systems may permit business partners, such as outside vendors, to logon to a company's system to initiate and complete a business transaction. For example, some companies may use a system to create and transmit electronic business documents, such as purchase orders, to a vendor, or supplier's, system. Vendors may logon to the supplier's system to view the business documents, and may have questions about these business documents.

For instance, a vendor may logon to the supplier's system and see a business document, such as a purchase order, from the buyer for 300 vintage rock concert T-shirts. The vendor may want to clarify the rock bands in which the buyer is interested. To clarify this, the vendor may ask the buyer a question via phone, fax, or e-mail. Alternatively, the vendor may retransmit the entire business document from the supplier's system to the buyer system with the question contained in an appropriate field. The buyer may respond with an answer in a similar fashion, either by retransmitting the business document with clarifying terms, or by communicating with the vendor through e-mail, the phone, or fax.

The buyer and vendor may want to communicate for reasons other than clarification, such as when negotiating terms contained in the business document and adding additional terms to the business document. These situations may also require communication through the methods previously described.

In other systems, a seller may advertise a product by posting information about the product on a web server, such as the product's image, specifications, shipping terms, and price. Potential buyers may search the web server to locate the product and view the product's information using a Web browser. If a buyer has a question about the product or the terms of the sale, such as the shipping terms, the buyer may contact the seller using a web interface to send the question to the seller. The seller may receive the question through e-mail, and the question may be posted on the web server so that it is publicly viewable to subsequent buyers. The seller may respond to the question by either e-mailing the questioning buyer and/or publicly posting an answer to the web site.

For example, a seller may post information about a bundled lot of pocket knives on a web server. Potential buyers may search for and locate information about the posted pocket knives. The buyer may then use a web interface to send to the seller a question about the knives, such as how many are included in the lot. The question may then be posted to the web server on a web page, and the seller may receive the message through e-mail. The seller may respond by posting the answer on the web server and/or by e-mailing the questioning buyer.

In another system, one or more sellers may upload their inventory database to a peer-to-peer network. A buyer may logon to the peer-to-peer network and search for a particular product. After finding the product, the buyer may click on a button to initiate negotiations for the product. The system alerts the seller that there is a potential buyer willing to negotiate for the purchase of the product. If the seller accepts, the buyer and seller begin a negotiation process guided by preformatted screens, which allow a real-time chat geared towards making a deal. For instance, they may first agree on the quantity required, then the shipping terms, and then the price of the product. Finally, the seller has the option to accept the purchase order and/or issue an invoice or reject the deal.

SUMMARY

One implementation provides a computer program product tangibly embodied in an information carrier. The computer program product includes instructions that, when executed, perform a method for processing a message related to an electronic document. The method includes transmitting an electronic document having a unique identifier from a first system to a second system and receiving at the first system a message from the second system related to content contained in the electronic document. The message includes a predetermined field for the unique identifier that links the message to the electronic document. The method may also include notifying a user of the first system that the first system received the message. The notifying may include updating a list of tasks. One of the tasks may indicate that the user may view the received message on the first system.

In selected embodiments, the computer program product may also include transmitting a second message from the first system to the second system. The second message may include a predetermined field containing the unique identifier that links the second message to the electronic document. The computer program product may also include maintaining a history for the electronic document using the unique identifier that is included in each message. The history may include each message transmitted by the first and second systems. The history may be visually displayed when the electronic document is accessed.

In a second general aspect, a method includes transmitting an electronic document having a unique identifier from a first system to a second system and receiving at the first system a message from the second system that relates to content contained in the electronic document. The message includes a predetermined field containing the unique identifier that links the message to the electronic document.

In a third general aspect, a system includes a system that is programmed to transmit an electronic document having a unique identifier from a first system to a second system and receive at the first system a message from the second system that relates to content contained in the electronic document. The message includes a predetermined field containing the unique identifier that links the message to the electronic document.

Advantages of the systems and techniques described herein may include any or all the following: improving the consistency and transparency in the communications between business partners; conveniently summarizing the negotiations and clarifications concerning a business document; decreasing the bandwidth required for business transactions; preventing information loss; eliminating the need to send entire business documents during negotiations; eliminating the need to create multiple versions of business documents when inconsequential terms are modified, added, or deleted; efficiently and conveniently storing information related an underlying business transaction; permitting convenient modification of information relating to a business document; and eliminating the need to use multiple mediums to exchange information related to a business document.

The details of one or more implementations are set forth in the accompanying drawings and the description below. Other features, objects, and advantages of the various implementations will be apparent from the description and drawings, and from the claims.

DESCRIPTION OF DRAWINGS

Like reference symbols in the various drawings indicate like elements.

DETAILED DESCRIPTION

Figure 1:
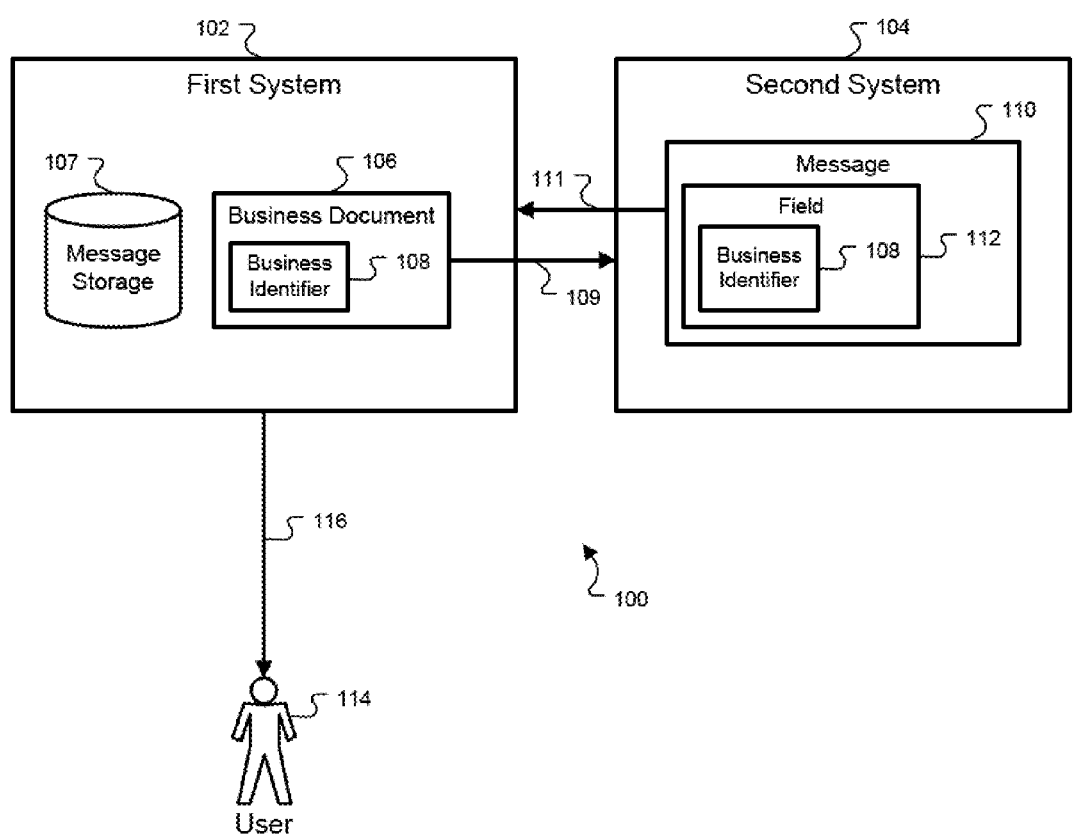
FIG. 1 is a block diagram of one implementation of a system that can transmit a message related to an electronic business document.

FIG. 1 is a block diagram of one implementation of a system 100 that can process a message related to an electronic business document. The system 100 includes a first system 102 and a second system 104. The first system 102 may be a buyer system, and the second system 104 may be a seller system. For example, a person who wishes to submit a purchase order may use the buyer system and a person who wishes to fulfill the purchase order may use the seller system. (Alternatively, the first system 102 may be a seller system, and the second system 104 may be a buyer system.) The first system 102 may transmit the business document 106 to the second system 104. This transmission is represented by an arrow 109. The business document 106, for example, may be a purchase order, a request for bids, an acceptance document, a sales order, or an advanced shipping notification. The business document 106 includes a business identifier 108. The business identifier 108 is unique for each business document and identifies the business document 106 or an item within the document 106.

The second system 104 receives the business document 106 and may respond by transmitting a message 110 to the first system 102. The transmission of the message from the second system 104 to the first system 102 is represented by the arrow 111. The message 110 may be related to the contents of the business document 106. For example, if the business document 106 is a purchase order for 500 live clown fish, a user of the second system 104 may send the message 110 that indicates only 450 clown fish are available. The second system 104 may also be configured to automatically scan, or search, content of the received business document 106 and determine an appropriate message to send. For example, the second system 104 may implement a scanning algorithm (explained in greater detail below) that searches the purchase order, retrieves the requested item and quantity (500 clown fish), and queries a database to determine if 500 clown fish are available. If enough fish are in stock, the second system 104 may generate a message to send to the first system 102 that indicates the full order may be filled. Otherwise, if only 450 fish are available, the second system 104 may generate a message indicating that only 450 fish are available.

Additionally, the message 110 includes a predetermined field 112 specifically for the business identifier 108 that links the message 110 to the business document 106 that was received. In one implementation, the second system 104 may extract the business identifier 108 from the business document 106 when it is received and may populate the field 112 with the identifier 108 before the message 110 is transmitted.

The business identifier 108 permits both the first system 102 and the second system 104 to associate the message 110 with the business document 106. This allows correct association when different business documents and associated messages are sent between the first and second systems 102, 104. For example, if one transmitted business document is a purchase order and a second transmitted business document is an invoice order, the unique business identifiers for each document permit the messages sent in response to the invoice order to be associated with the invoice order, and the message sent in response to the purchase order to be associated with the purchase order. Using the business identifier 108 also permits each system 102, 104, to retrieve all the messages associated with a particular business document. For example, if a user of the first system 102 accesses the business document 106, the message 110 may also be retrieved from a message storage 107 and displayed with the document 106. The second system 104 may also permit access and retrieval of the message 110 and the business document 106 from a second message storage (not shown) in a similar fashion.

The first system 102 receives the message 110 from the second system 104, and notifies a user 114 of the first system 102 that the system 102 received the message 110. This notification is represented by the arrow 116. The notification may indicate that an event associated with the business document 106 has occurred. Additionally, the notification may offer a preview or the full text of the message that was received. The notification may include a link to the business document 106 or to the message 110 which the user may select to access the document or message. The notification may include an e-mail sent to the user 114, updating an application of the user 114 to reflect that the message has been received, an audio alert, a visual alert, or any combination thereof. For example, the notification may cause an application of the user 114 to sound an audible alert and present a window that includes text describing the affected business document, the first few lines of the message, and the sender of the message.

The notification may occur immediately after the first system 102 receives the message 110, or at a set or triggered time later. For example, if the notification is not performed immediately after the first system 102 receives the message 110, the notification may be triggered when the user 114 logs onto the first system 102. When the user logs on, the first system 102 may then transmit a notification to an application of the user 114, which indicates that a message has been received. Alternatively, the user 114 may receive a notification of any messages received on hourly, daily, and weekly basis. For example, the first system 102 may regularly send out notifications to the user every five minutes, or an application of the user may query the first system 102 every five minutes to determine if a message has been received. If the query returns an affirmative response, a notification may be sent from the first system 102 to the user 114.

The first system 102 and the second system 104 may be implemented as separate computing devices, which may be geographically separated or housed together. The transmissions 111, 109, and 116 may occur over single or multiple transmission lines, which may be part of a private network, the Internet, or any combination thereof. The transmissions may also take place over a wireless network, such as an 802.11 network or a Bluetooth network. The user 114 may employ a separate computing device that communicates with the first system 102 or may use the computing device on which the first system 102 is implemented. Alternatively, the first system 102 and the second system 104 may be implemented on a common computing device. The transmissions 111 and 109 may be internal to the common computing device on structures, such as a system bus, Peripheral Component Interconnect (PCI) bus, and a shared memory.

Figure 2:
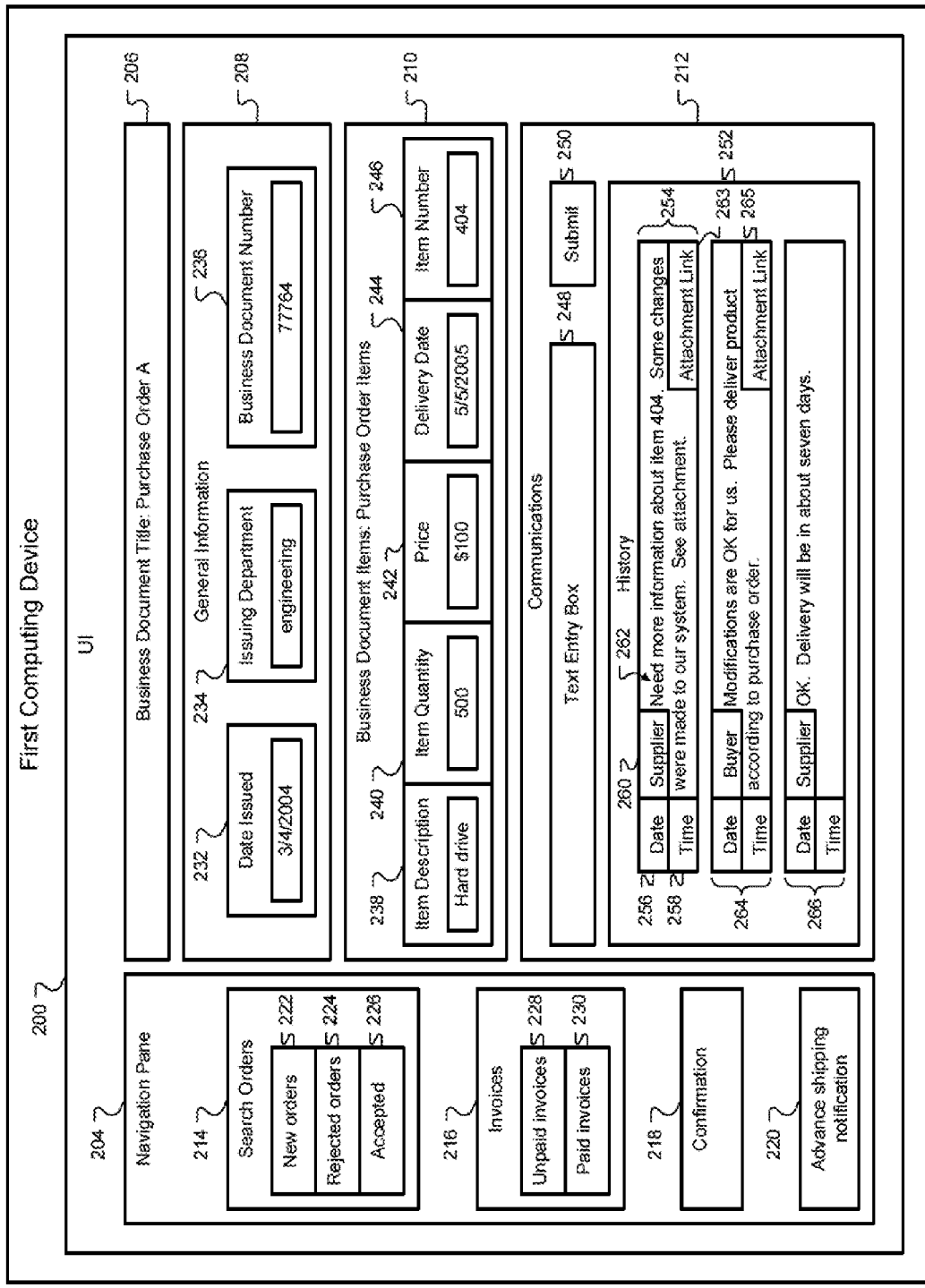
FIG. 2 is an example of a user interface (UI) for transmitting and receiving messages that may be generated by the system shown in FIG. 1.

FIG. 2 is an example of a user interface (UI) 200 for transmitting and receiving messages that may be generated by the system 100 shown in FIG. 1. The UI 200 may be implemented at a first computing device 202, which may be employed by the user 114. The UI 200 may be displayed on a monitor (not shown) of the first computing device 202. The UI 200 may provide a graphical means for communicating with the first system 102. In the example shown in FIG. 2, the UI 200 contains several components including a navigation pane 204, a business document title 206, a general information section 208 that contains details that are applicable to the entire business document, a business document items section 210 that contains details that are applicable to specific items within the business document, and the communications section 212 that displays received messages and provides an interface for inputting messages for transmission.

Additionally, the UI 200 may also be implemented at a second computing device, which communicates with the second system 104. Users of both the first and the second systems 102, 104 may use the UI 200 to input and view messages related to a particular business document.

In FIG. 2, the navigation pane 204 includes several subsections, such as search orders 214, invoices 216, confirmations 218, and advance shipping notifications 220. Each subsection may permit the user 114, or a user of the second system 104, to navigate to a desired business document. For example, the user 114 may select the new orders link 222 to search business documents that are categorized as new orders. Selecting the new orders link 222 may cause the navigation pane to expand so that additional criteria may be entered to filter the results of the search. Alternatively, a new screen may be displayed in a section outside of the navigation pane that permits inputting additional filter criteria. Similarly, the rejected orders link 224 and the accepted orders link 226 may be selected by a user to facilitate location of a particular order.

The invoices 216, confirmations 218, and advance shipping notifications 220 sections may be employed by a user to locate business documents categorized as invoices, confirmations, and advance shipping notifications, respectively. For example, a user may select the unpaid invoices link 228 or the paid invoices link 230 within the invoices section 216 to initiate a search or filter to locate an unpaid or paid invoice business document, respectively. Similarly, a user may select links (not shown) within the confirmations 218 and advance shipping notifications 220 sections to locate or access business documents related to sales, order confirmations, and shipping details.

The business documents that are located using the navigation pane may be created on the first computing device 202, or may be created on a separate computing device. For example, if the business document is a purchase order, it may be created by a specific department, such as the engineering department. The engineering department may maintain a database on a separate computing device that is queried by the first computing device 202 to locate the purchase order, or the separate computing device may transmit the business document to a central storage area where all or some of the business documents are stored. The first computing device 202 may then query the central storage area to locate the desired business document.

After the desired business document is located and accessed, it is displayed within the UI 200. In FIG. 2, for example, to view a new purchase order that has not been accepted yet, a user may select the new orders link 222 within the search orders section 214 of the navigation pane 204. The selection may bring up additional screens or modify existing screens (not shown) for entering additional search criteria, such as the date the purchase order was issued, to whom it was issued, and the business document identifier. After a user has inputted the desired criteria, the new purchase order may be located, accessed, and displayed.

In FIG. 2, the business document title 206 is displayed as purchase order A. The general information section 208 contains information about purchase order A, such as the date issued 232, the issuing department 234, and the business document number 236. In this example, the purchase order A was issued Mar. 4, 2004 by the engineering department and was assigned a business document number 77764.

The business document items section 210 contains information about specific items within the purchase order A. For example, in FIG. 2, the purchase order items include a request for hard drives. The section 210 may contain an item description 238 that lists the item as a hard drive. The section 210 also may contain the item quantity 240, the price 242, the requested delivery date 244 for the item, and the item number 246. In this example, the purchase order is for 500 hard drives at a price of $100 each for delivery by May 5, 2005. The item number 246 is unique for each item within a business document, and permits messages to be exchanged regarding a single item within a business document, which will be discussed in more detail below. In the example shown in FIG. 2, the item number 246, which is 404, is uniquely associated with the request for hard drives. If there was a separate request item for motherboards, the item may have a different item number, such as 421.

When a business document is displayed, the communications section 212 may also be viewed. The communication section 212 may have a text entry box 248 for inputting messages related to the business document that is displayed. For example, the user may select the text entry box 248 with a pointing device, such as a mouse, and input a message with an I/O device, such as a keyboard. After the user has typed the message, the user may select a submit button 250, which may submit the message to the first system 102 for transmission of the message to the second system 104.

The user may also input the messages by other means, such as voice recognition software or selection of predetermined messages from a drop-down box. For example, in addition to the submit button, there may also be a record button. The user may speak into a microphone that is attached to the computing device. Speech recognition software may accept the recorded message, translated the message into text, and insert it into the text entry box 248 or directly submit it to the first system 102. If a drop-down box is used, the box may contain several commonly entered messages from which a user may select. For example, common messages may include "the order is rejected," "the order is accepted," "shipping will take place within three business days," and "modified terms are acceptable; please deliver according to agreed-upon terms."

The communication section 212 may also include a history subsection 252. The history subsection 252 may include each message that is associated with the displayed business document. For example, in FIG. 2, the first message 254 includes the date 256 the message was sent, the time 258 the message was sent, and the source 260 of the message, which is the supplier. The first message 254 also includes the following message text 262: "Need more information about item 404. Some changes were made to our system. See attachment." The message may also include an attachment link 263. The user may select the attachment link 263 to access an attachment that is linked to the message. In this example, the user may select the attachment link 263 to access a text document that describes changes that were made to the suppliers system. Other types of attachments may be linked to the message, such as sound file, a video file, an image file, a spreadsheet, an e-mail, a slide presentation, and a design file.

The history section 252 may contain multiple messages that have been sent between the first and second systems 102, 104. For example, in FIG. 2, three messages are displayed. The messages may represent a complete history of negotiations, clarifications, and/or additional supplemental terms related to the business document. In the first message 254, the supplier asked for additional information about item 404, which is the hard drive item, and informed the buyer of changes made to supplier's system. In the second message 264, the buyer acknowledges the modifications are "OK," and directs the supplier to an attachment link 265 within the message for clarification on the item 404. In the third message 266, the supplier agrees to fill the order and deliver in approximately seven days. Each message may display who sent the message and the date and time it was sent. The messages may be listed in chronological order with the earliest sent message either displayed first or last. The messages may also be sorted by message source or based on the presence of attachments.

The first computing device 202 or the first system 102 may determine which messages to display in the history section 252 based on whether the business identifier 108 contained within the predetermined field 112 of each message matches the business identifier of the displayed business document. For example, in FIG. 2, the business identifier for the purchase order A is the document number 236, which is 77764. Each of the messages displayed in the history section 252 contains a document number which matches 77764 (not shown). The business identifier of each message and of the business document may or may not be visible to the user. Messages with business identifiers that do not match the business document may not be displayed.

The communications section 212 may be minimized to view a larger portion of the business document. The user may select a minimization link or button (not shown) to minimize the section 212 and select a maximization link or button (also not shown) to maximize the section 212.

Figure 3:
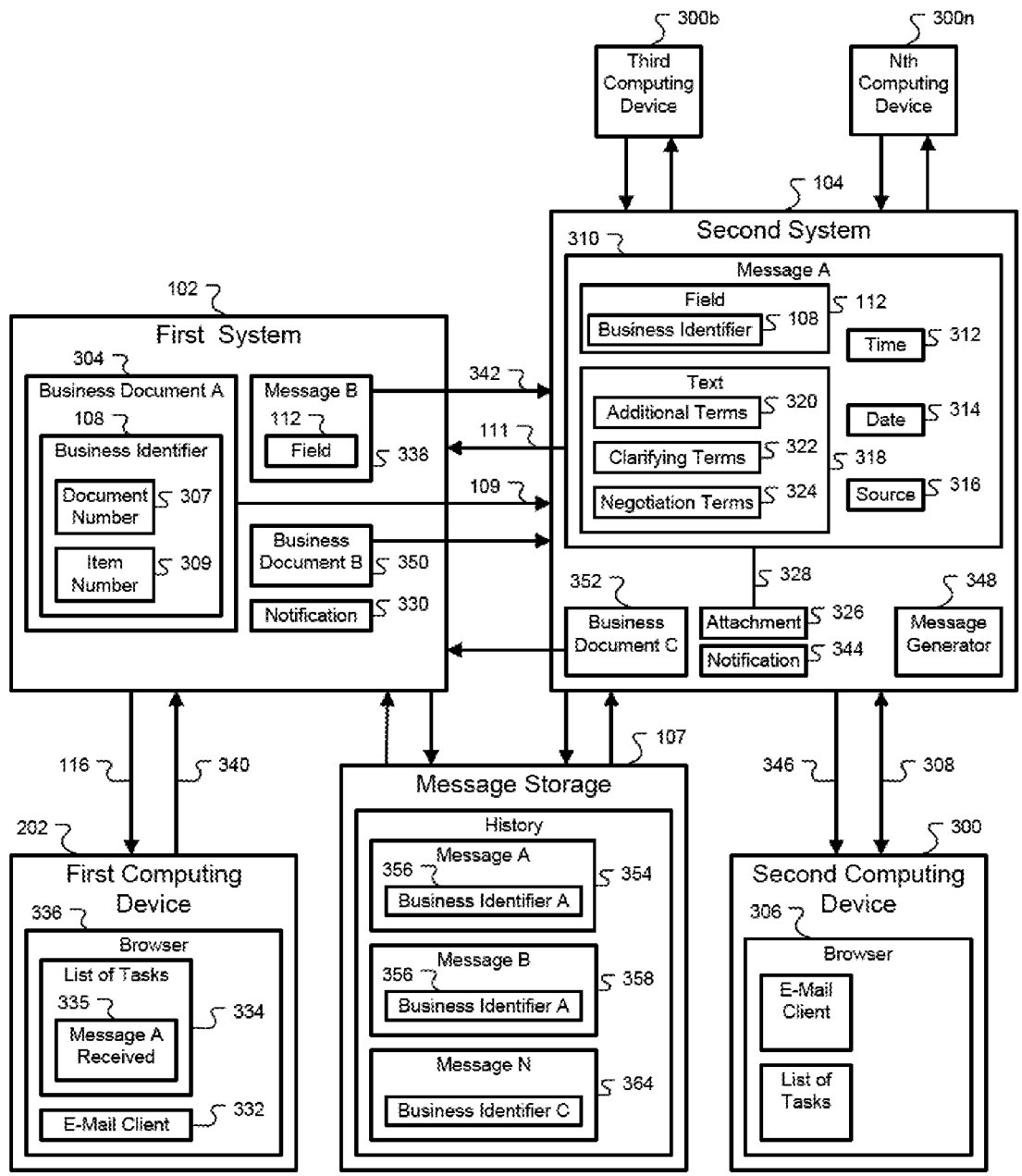
FIG. 3 is a block diagram with further details of the system shown in FIG. 1, according to one implementation.

FIG. 3 is a block diagram with further details of the system 100 shown in FIG. 1, according to one implementation. FIG. 3 includes the first system 102 and the second system 104, each of which may transmit and receive one or more business documents and messages. The first computing device 202 may communicate with the first system 102, and a second computing device 300 may communicate with the second system 104. The computing devices 202, 300 may be employed by users to input and view messages and business documents transmitted between the first and second systems 102, 104. FIG. 3 also shows the message storage 107, which may contain a history of messages sent between the first and second systems.

In one implementation, the second system 104 is a seller system and the first system 102 is a buyer system. The seller system 104 may be used by vendors to determine whether a buyer needs an item. The buyer system may be used to transmit requests for items, such as purchase orders to the seller system. For example, business document A 304 may be a purchase order that is transmitted from the first system 102, or buyer system, to the second system 104, or seller system. A copy of the business document A 304 may be stored on the second system 104 (not shown). The business document A 304, contains a business identifier 108 that uniquely identifies the business document. The business identifier 108 may include identifiers, such as a document number 307 and an item number 309. The document number 307 may represent an identifier that refers to the entire business document, and item number 309 may represent an identifier that specifies a particular item or a group of items that are included in the business document. For example, the business document may be a purchase order, which may have a document number that specifies the entire purchase order. The purchase order may contain requests for several items, such as hard drives, motherboards, and power supplies. The hard drives may have one item number, the motherboards another item number, and the power supplies a third item number.

A vendor using the second computing device 300 may use a browser 306 to logon to the second system 104. This initial request for access and establishment of connection is represented by the double headed arrow 308. Once logged on, the browser 306 may display a user interface similar to the UI 200. The vendor may use the new orders link 222 in the navigation pane 204 to locate any new purchase orders that the vendor may fill. The business document A 304, which in this case is a new purchase order, may be located on the second system 104, accessed, transmitted to the second computing device 300, and displayed on the UI 200 using the browser 306. If the vendor accessed the purchase order A for 500 hard drives, as shown in FIG. 2, the vendor could input a message A 310, which states that only 495 hard drives are available and asks the buyer if this is acceptable. After the message is entered, the vendor could press the submit button 250 to send the message to the first system 102. A copy of the message A 310 may then be sent from the second system 104 to the first system 102 as represented by the arrow 111.

The messages and business documents sent between the first and second systems 102, 104 may be implemented in XML (Extensible Markup Language). The business documents may contain more tags, or predetermined fields, and information than the messages. Because the messages contain less information and fields, they may be significantly smaller than the business documents, which allows the messages to be transmitted quickly and with less bandwidth than the business documents. Additionally, the use of messages may isolate specific terms of a business document that are added, clarified, or negotiated, which may make the transaction process more transparent when compared to determining these changes by viewing multiple versions of the entire business document. The presentation of a history of messages can be a succinct method to summarize the communications related to a business transaction.

Before the message is sent, the business identifier 108 contained within the business document A 304 may be used to populate the predetermined field 112 within the message A 310. In one implementation, the predetermined field 112 may be an XML tag, or markup code. For example, if the business identifier 108 is the business object number, the predetermined field 112 may be an XML tag with the descriptor "business object number." The second computing device 300 may search the copy of the business document A 304 that is displayed on the browser 306 and retrieve the business identifier 108. The business identifier 108 may then be inserted in the predetermined field 112 of each message transmitted that is specifically related to the business document from which the business identifier 108 was retrieved. Alternatively, the second system 104 may implement a search algorithm to search the business document A 304 for the business identifier 108. The search algorithm may be programmed to recognize particular fields within the business document using a list of field names stored on the system 104 and retrieve the values contained within those fields, such as the business identifier 108. After the second system 104 retrieves the business identifier 108, it may then insert the identifier 108 in the predetermined field 112 of the message A 310.

In addition to the business identifier 108 contained in the predetermined field 112, a message may contain other information. Referring to FIG. 3, the message A 310 includes time 312, date 314, and source information 316. The time 312 and date 314 information may be the time and date the message A 310 is sent, and the source information 316 may be the user that sent the message, such as the supplier or buyer. The message A 310 may also include message text 318, which may be additional terms 320, clarifying terms 322, and negotiating terms 324. For example, additional terms 320 may be further requirements that pertain to shipping that were not described in the business document. The clarifying terms 322 may be requests to clarify information in the business document, and the negotiating terms 324 may be proposed changes in the terms of the business document.

In one implementation, the message a 310 may include one or more attachments. As shown in FIG. 3, the attachment 326 is linked to the message A 310 as represented by the line 328. The attachment 326 may be accessed by a link or button contained within the message A 310, or it may be displayed in a subsection of the message A 310 when the message is viewed by the user. The attachment may include files, such as a text document, a sound file, a video file, an image file, a spreadsheet, an e-mail, a slide presentation, and a design file.

Alternatively, when the second system 104 receives the business document A 304, the system 104 may respond to the business document automatically using a message generator 348. The message generator 348 may be software implemented at the second system 104 that responds to incoming messages from the first system 102. The message generator 348 may contain instructions that when executed search particular fields within the incoming business document using a pattern recognition algorithm, query a database (not shown), and generate a message based on the content of the fields. For example, if the business document A 304 is a purchase order for 500 hard drives, the message generator 348 may search the business document A for predetermined fields that contain the item description and the item quantity. The generator 348 may accomplish the search by comparing the label for each of the predetermined fields with a set of searching labels (not shown) stored on the second system 104. For instance, the set of searching labels may include a searching label "item description." The generator 348 compares the labels for each of the predetermined fields with the searching label "item description" until a predetermined field with matching text is found. Once a matching label is found, the generator 348 may retrieve the value, or information, contained within the predetermined field associated with the matching label.

After retrieving this information, the message generator 348 may query a local database and determine if the supplier has such an item and whether the supplier has enough quantity to satisfy the purchase order. If the supplier does have the item and enough quantity, the message generator 348 may generate a message accepting the purchase order. If the supplier does not have the item or does not have enough of the item, the generator 348 may generate a message indicating this and suggest a substitution or asking if a reduced quantity is acceptable. For example, if the supplier only has 495 flash drives instead of 500 hard drives, the message generator 348 may respond with a message asking if a delivery of 495 flash drives would be acceptable.

After the message A 310 is received by the first system 102, the system 102 may send a notification 330 that the message has been received to the first computing device 202. The transmission of the notification 330 is represented by the arrow 116. The notification may be an e-mail that is sent to an e-mail client 332 implemented at the first computing device 202. The e-mail may contain a link to access the business document A 304 and the related message A 310. The e-mail may also include the contents of the message, such as the text 318, the time 312, the date 314, and the source 316 of the message. The notification 330 may also update a list of tasks 334 that is displayed within an application executed on the first computing device 202. The tasks 334 may include "to do" items, such as project deadlines, alerts, assignments for completion, and appointments. The notification 330 may cause the computing device 202 to add an alert 335 to the tasks 334 that informs the user that a message has been received concerning a particular business document. The alert 335 may contain a link to access the business document and related message. The application that displays the alert may be a browser 336.

The message generator 348 may work in cooperation with the notification method described above or in place of it. The message generator 348 may contain a set of rules that dictate whether the notification 344 may be sent to the second computing device 300. For example, if the supplier's available quantity of an item differs by more than three percent of the requested quantity of item, then the notification 344 would be sent. Otherwise, the message generator 348 would automatically generate a message asking if the reduced quantity would be acceptable to the buyer.

In one implementation, the user of the first computing device 202 may be presented with a user interface similar to the UI 200 shown in FIG. 2 when the user accesses the business document A 304. The user may view the first message 254 sent from the supplier, and may enter a message B 338 in the text entry box 248. A copy of the message B 338 may be transmitted from the first computing device 202 to the first system 102 as represented by the arrow 340. The message B 338 may then be transmitted from the first system 102 to the second system 104 as represented by the arrow 342. The message B 338 also contains the predetermined field 112 populated with the business identifier 108. The business identifier 108 may be retrieved and inserted in the message B 338 similar to the method earlier described.

After the message B 338 is received by the second system 104, the system 104 may send a notification 344 to the second computing device 300 as represented by the arrow 346. The notification 344 may be accomplished in a similar manner to the notification 330 sent to the first computing device 202.

The first and second systems 102, 104 may continue to transmit and receive messages until an agreement is reached regarding the business document. The systems 102, 104 may also send additional or revised business documents based on the messages. For instance, if business document A 304 is a purchase order, an agreement may be reached, based on the exchange messages, that the supplier will fulfill the purchase order. A business document B 350, which may be an acceptance document, may then be sent from the first system 102 to the second system 104. Messages may also be sent in response to this new business document. For example, the second system 104 may send a message acknowledging the receipt of the agreement business document. Additionally, the second system 104 may send a business document C 352 in response to messages or business documents the system 104 receives. For example, if an agreement is reached to fulfill a purchase order document, the system 104 may send the business document C 352, which may be an invoice order for the fulfilled purchase order.

The second system 104 may communicate with multiple computing devices, such as the second computing device 300, and a third computing device 300*b* through an Nth computing device 300*n*. Each of these computing devices may be vendors, or suppliers. The vendors may be able to access the same business documents on the second system 104, or the vendors may be limited to only view a subset of the business documents, such as business documents related to the inventory they carry or business documents specifically addressed to them.

If multiple vendors are able to view the same business document they may independently send messages which contain bidding or negotiating terms based on the business document. For example, if the vendors are viewing a purchase order, they may submit messages containing their price quote. Additionally, if each vendor employs a user interface, such as the UI 200 in FIG. 2, each vendor may be restricted from viewing messages sent by other vendors. Each message sent by the vendor may contain a vendor identifier (not shown) that is used to filter the messages that are displayed to the vendors so that a vendor may only see messages the vendor sent along with any responses from the buyer.

The first system 102 may also be able to communicate with multiple computing devices, such as the first computing device through computing device N (not shown). Each computing device may be employed by user in charge a specific set of business documents. For example, the user of the first computing device 202 may be in charge of purchase orders for a particular department, such as the engineering department. This user's access may be limited to business documents originating from or concerning the engineering department.

Both the first system 102 and the second system 104 may have access to the message storage 107 that stores the messages transmitted between the two systems. The message storage 107 may be implemented as a database at the first system 102, the second system 104, or a copy the database containing the messages may be maintained at both systems. Additionally the message storage 107 may be implemented on a separate computing device. By accessing the message storage 107, each system may track the messages associated with particular business documents. The systems may use the business identifier embedded in each message to associate the messages with the appropriate business documents. For example, in FIG. 3, the second system 104 may access message A 354, and message B 358 and display the messages when the business document A 304 is accessed. The system 104 uses the business identifier A 356 that is embedded in both message A 354, and message B 358 to determine that those messages are associated with the business document A. The message N 364 contains the business identifier C, so the system 104 may determine that it is not associated with the business document A and should not be displayed. The messages may be displayed in a manner similar to that shown in the history section 252 of FIG. 2.

Figure 4:
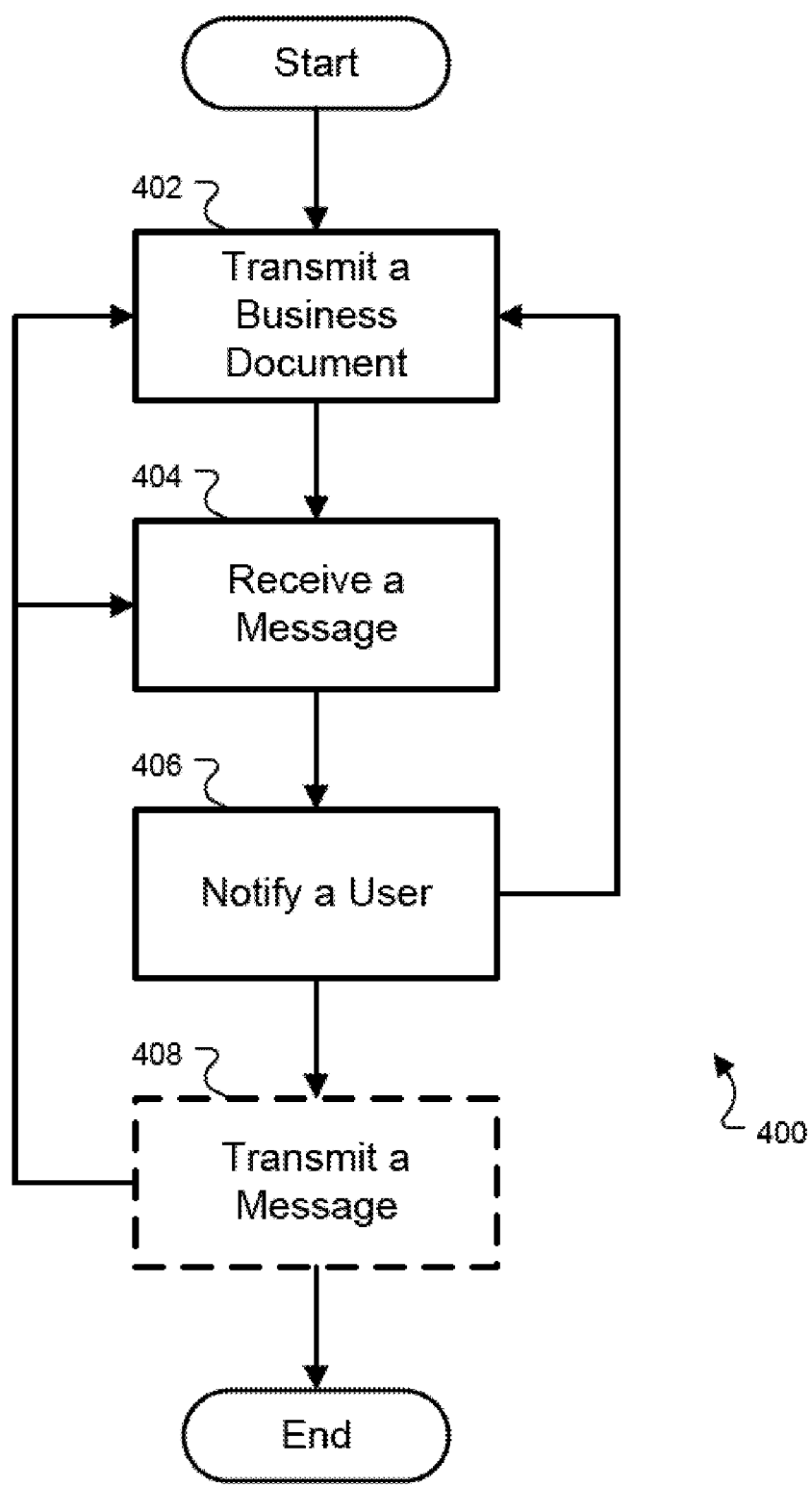
FIG. 4 is a flowchart of one implementation for transmitting and receiving messages.

FIG. 4 is a flowchart 400 of one implementation for transmitting and receiving messages of the system 100. For example, a computer program product may include instructions that cause a processor to perform operations comprising the stages of method 400. As shown in FIG. 4, the method 400 includes the following stages:

An operation "transmit a business document" is performed in a stage 402. A business document with a unique identifier is transmitted from a first system to a second system. For example, the first system 102 may transmit the business document A, such as a purchase order, to the second system 104. The purchase order contains an identifier, such as a document number, that permits the purchase order to be uniquely identified. The first system 102 may be a system used by buyers and the second system 104 may be a system used by sellers.

An operation "receive a message" is performed in a stage 404. The first system receives a message from the second system related to the content of the business document. The message includes a predetermined field for the business identifier that links the message to the business document. For example, the first system 102 may receive the message A 310 from the second system 104. The message A 310 may be implemented in XML and may contain a predetermined field, or coded tag, which contains the business identifier 108 of the business document A 304, that was previously sent to the second system 104.

An operation "notify a user" is performed in a stage 406. A user of the first system is notified that the first system received the message. For example, the first system 102 may send a notification 330 to a first computing device 202 that the message a 310 has been received. The notification 330 may include an e-mail sent to the user of the first computing device 202. After stage 406, stage 402 may be performed, optional stage 408 may be performed, or the method may end. If stage 402 is performed, the first system may transmit a business document as previously described. Otherwise, optional stage 408 may be performed.

An optional operation "transmit a message" may be performed in stage 408. A second message may be transmitted from the first system to the second system. The second message includes a predetermined field containing the business identifier that links a second message to the business document. After the user accesses the message A 310, the user may want to respond by sending an additional message B to the second system 104. For example, the message A 310 may indicate that the vendor, or user of the second system 104, can only fulfill part of the purchase order. The user of the first system 102, or the buyer, may transmit the message B to the vendor either accepting or rejecting the vendor's proposal. After stage 408, stage 402 or stage 404 may be performed as previously described. Otherwise, the method 400 may end.

Figure 5:
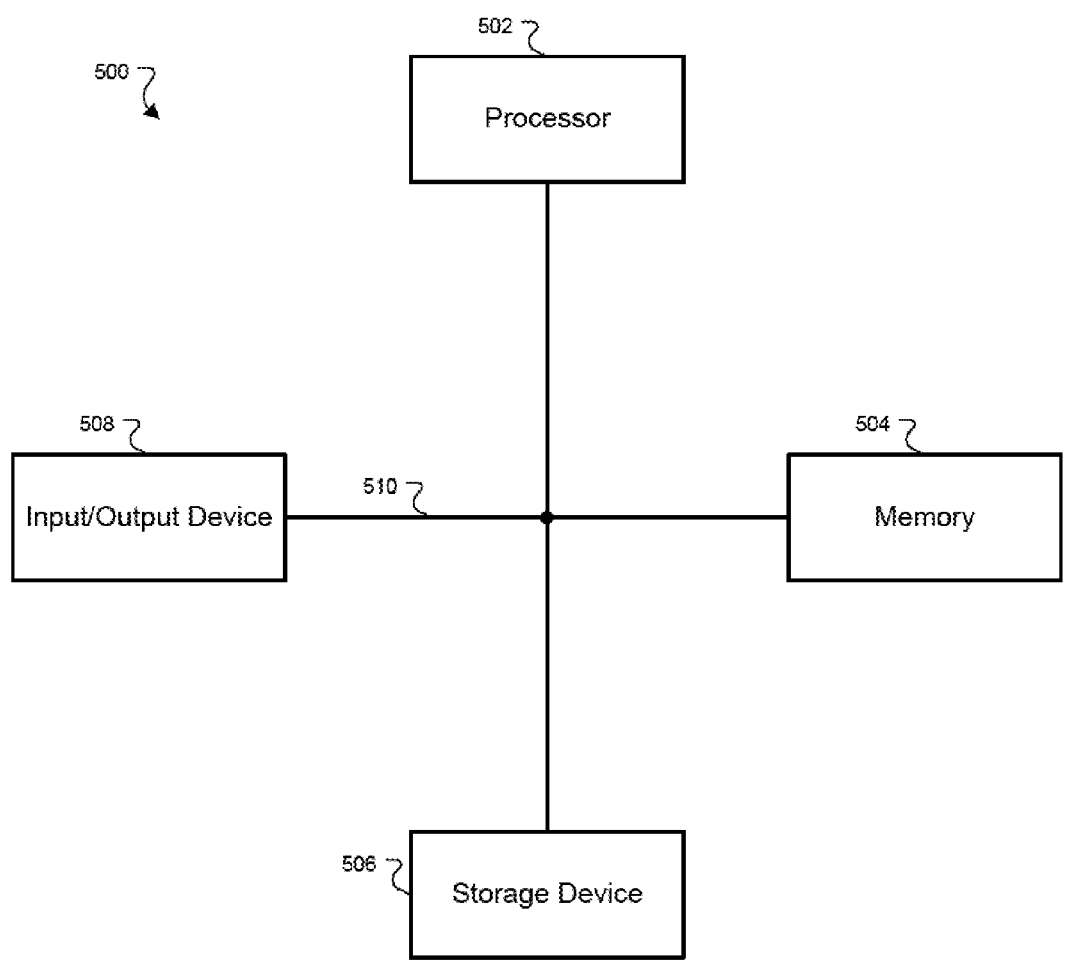
FIG. 5 is a block diagram of a general computer system.

FIG. 5 is a block diagram of a general computer system 500. The computer system 500 can be used in the operations described above, according to one implementation. For example, the system 500 may be included in any or all of the first system 102, second system 104, first computing device 202, second computing device 300, and third computing device 300*b* through Nth computing device 300*n*.

The system 500 includes a processor 502, a memory 504, a storage device 506 and an input/output device 508. Each of the components 502, 504, 506 and 508 are interconnected using a system bus 510. The processor 502 is capable of processing instructions for execution within the system 500. In one implementation, the processor 502 is a single-threaded processor. In another implementation, the processor 502 is a multi-threaded processor. The processor 502 is capable of processing instructions stored in the memory 504 or on the storage device 506 to display graphical information for a user interface, such as the UI 200 in FIG. 2, on the input/output device 508.

The memory 504 stores information within the system 500. In one implementation, the memory 504 is a computer-readable medium. In one implementation, the memory 504 is a volatile memory unit. In another implementation, the memory 504 is a non-volatile memory unit.

The storage device 506 is capable of providing mass storage for the system 500. In one implementation, the storage device 506 is a computer-readable medium. In various different implementations, the storage device 506 may be a floppy disk device, a hard disk device, an optical disk device, or a tape device.

The input/output device 508 provides input/output operations for the system 500. In one implementation, the input/output device 508 includes a keyboard and/or pointing device. In one implementation, the input/output device 508 includes a display unit for displaying the UI 200.

Various implementations can be implemented in digital electronic circuitry, or in computer hardware, firmware, software, or in combinations of them. Apparatus can be implemented in a computer program product tangibly embodied in an information carrier, e.g., in a machine-readable storage device or in a propagated signal, for execution by a programmable processor; and method steps of the various implementations can be performed by a programmable processor executing a program of instructions to perform functions of the various implementations by operating on input data and generating output. The implementations can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, various implementations can be implemented on a computer having a display device, such as a CRT (cathode ray tube) or LCD (liquid crystal display) monitor for displaying information to the user and a keyboard and a pointing device, such as a mouse or a trackball by which the user can provide input to the computer.

The various implementations can be implemented in a computer system that includes a back-end component, such as a data server, or that includes a middleware component, such as an application server, such as the first and second systems 102, 104, or an Internet server, or that includes a front-end component, such as a client computer having the UI 200 or an Internet browser, such as the browser 306, or any combination of them. The components of the system can be connected by any form or medium of digital data communication, such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this application. For example, the stage 408 of FIG. 4 may be optional and may lead to stage 402, 404, or end the method. Additionally, the message storage may be implemented at the first system 102, the second system 104, or at an independent computing device. Accordingly, other implementations are within the scope of the following claims.

What is claimed is:

1. A computer program product tangibly embodied in computer-readable memory storage medium, the computer program product including instructions that, when executed by a processor, perform a computer-implemented method for providing a display on a display device of information about a stored electronic business document, the method comprising:

providing, within a first computing system, an electronic business document that is stored in computer-readable memory medium and that was received by the first computing system from a second computing system, the electronic business document having an identifier that is unique to the electronic business document so as to distinguish the electronic business document from other electronic business documents, wherein the electronic business document was also received from the second computing system by a third computing system; and in response to the receipt of a user input at the first computing system, indicating a request by a user to access the electronic business document having the unique identifier, accessing the electronic business document having the unique identifier, extracting from the electronic document the unique identifier, and displaying the following in a common graphical user interface (GUI) of a display device of the first computing system:

(1) in a first area of the GUI, content extracted from the electronic business document;

(2) in a second area of the GUI that is distinct from the first area, user interface controls for creating and sending, from the first computing system to the second computing system, new electronic messages pertaining to the electronic business document for which content is being displayed in the first area of the GUI, and (3) in a third area of the GUI that is distinct from both the first area and the second area, a list view that identifies stored electronic messages, the list view of stored electronic messages including:
  (a) messages that were previously created and sent from the first computing system to the second computing system using the user interface controls in the second area of the GUI, and that are stored in computer-readable memory medium, and
  (b) messages that were received by the first computing system from the second computing system, and that are stored in computer-readable memory medium;
each of the electronic messages identified in the list view having stored, in association therewith in the memory medium:
  (c) the unique identifier that was extracted from the electronic business document upon the electronic business document being accessed and that distinguishes the electronic business document from other electronic business documents, and
  (d) an identifier of the first computing system or of a user of the first computing system;
wherein the third computing system also sent, to the second computing system, electronic messages pertaining to the electronic document; and
wherein the first computing system is restricted from displaying the electronic messages that the third computing system sent to the second system so that the list view in the third area of the GUI of the first computing system only displays electronic messages that are associated with the identifier of the first computing system or of the user of the first computing system.

2. The computer program product of claim 1, wherein the unique identifier is an electronic document number, and wherein the electronic document number is a number uniquely associated with the electronic business document.

3. The computer program product of claim 1, wherein the unique identifier is not visible to a user viewing the GUI.

4. The computer program product of claim 1, wherein the method further comprises receiving user input under the control of the user interface controls of the second area of the GUI to create a new message pertaining to the business document, and inserting into the new message the unique identifier of the business document.

5. The computer program product of claim 4, wherein the method further comprises sending the new message including the unique identifier contained within the message.

6. A computer-implemented method for providing a display on a display device of information about a stored electronic business document, the method comprising:
providing, within a first computing system, an electronic business document that is stored in computer-readable memory medium and that was received by the first computing system from a second computing system, the electronic business document having an identifier that is unique to the electronic business document so as to distinguish the electronic business document from other electronic business documents, wherein the electronic business document was also received from the second computing system by a third computing system; and
in response to the receipt of a user input at the first computing system, indicating a request by a user to access the electronic business document having the unique identifier, accessing the electronic business document having the unique identifier, extracting from the electronic document the unique identifier, and displaying the following in a common graphical user interface (GUI) of a display device of the first computing system:
  (1) in a first area of the GUI, content extracted from the electronic business document;
  (2) in a second area of the GUI that is distinct from the first area, user interface controls for creating and sending, from the first computing system to the second computing system, new electronic messages pertaining to the electronic business document for which content is being displayed in the first area of the GUI, and
  (3) in a third area of the GUI that is distinct from both the first area and the second area, a list view that identifies stored electronic messages, the list view of stored electronic messages including:
    (a) messages that were previously created and sent from the first computing system to the second computing system using the user interface controls in the second area of the GUI, and that are stored in computer-readable memory medium, and
    (b) messages that were received by the first computing system from the second computing system, and that are stored in computer-readable memory medium;
  each of the electronic messages identified in the list view having stored, in association therewith in the memory medium:
    (c) the unique identifier that was extracted from the electronic business document upon the electronic business document being accessed and that distinguishes the electronic business document from other electronic business documents, and
    (d) an identifier of the first computing system or of a user of the first computing system;
  wherein the third computing system also sent, to the second computing system, electronic messages pertaining to the electronic document; and
  wherein the first computing system is restricted from displaying the electronic messages that the third computing system sent to the second system so that the list view in the third area of the GUI of the first computing system only displays electronic messages that are associated with the identifier of the first computing system or of the user of the first computing system.

7. The method of claim 6, wherein the method further comprises receiving user input under the control of the user interface controls of the second area of the GUI to create a new message pertaining to the business document, and inserting into the new message the unique identifier of the business document.

8. The method of claim 7, wherein the method further comprises sending the new message including the unique identifier contained within the message.

9. A computing system that is programmed to perform the following computer-implemented operations:
provide, within a first computing system, an electronic business document that is stored in computer-readable memory medium and that was received by the first computing system from a second computing system, the electronic business document having an identifier that is unique to the electronic business document so as to distinguish the electronic business document from other electronic business documents, wherein the electronic business document was also received from the second computing system by a third computing system; and
in response to the receipt of a user input at the first computing system, indicating a request by a user to access the electronic business document having the unique identifier, access the electronic business document having the unique identifier, extract from the electronic document the unique identifier, and display the following in a common graphical user interface (GUI) of a display device of the first computing system:

(1) in a first area of the GUI, content extracted from the electronic business document;

(2) in a second area of the GUI that is distinct from the first area, user interface controls for creating and sending, from the first computing system to the second computing system, new electronic messages pertaining to the electronic business document for which content is being displayed in the first area of the GUI, and (3) in a third area of the GUI that is distinct from both the first area and the second area, a list view that identifies stored electronic messages, the list view of stored electronic messages including:

(a) messages that were previously created and sent from the first computing system to the second computing system using the user interface controls in the second area of the GUI, and that are stored in computer-readable memory medium, and (b) messages that were received by the first computing system from the second computing system, and that are stored in computer-readable memory medium;

each of the electronic messages identified in the list view having stored, in association therewith in the memory medium:

(c) the unique identifier that was extracted from the electronic business document upon the electronic business document being accessed and that distinguishes the electronic business document from other electronic business documents, and (d) an identifier of the first computing system or of a user of the first computing system;

wherein the third computing system also sent, to the second computing system, electronic messages pertaining to the electronic document; and wherein the first computing system is restricted from displaying the electronic messages that the third computing system sent to the second system so that the list view in the third area of the GUI of the first computing system only displays electronic messages that are associated with the identifier of the first computing system or of the user of the first computing system.

10. The computing system of claim 9, wherein the system is further programmed to receive user input under the control of the user interface controls of the second area of the GUI to create a new message pertaining to the business document, and insert into the new message the unique identifier of the business document.

11. The computing system of claim 10, wherein the system is further programmed to send the new message including the unique identifier contained within the message.

12. The computer program product of claim 1, wherein:

each of the electronic messages sent by the third computing system to the second computing system is associated with the unique identifier of the electronic business document and an identifier of the third system or of a user of the third system; and restricting the first computing system from displaying the electronic messages includes filtering the messages that the second computing system receives from the first computing system and the third computing system so that the first computing system does not display the electronic messages sent by the third computing system to the second computing system based on the electronic messages sent by the third computing system to the second computing system being associated with the identifier of the second computing system or of the user of the second computing system.

13. The method of claim 6, wherein:

each of the electronic messages sent by the third computing system to the second computing system is associated with the unique identifier of the electronic business document and an identifier of the third system or of a user of the third system; and restricting the first computing system from displaying the electronic messages includes filtering the messages that the second computing system receives from the first computing system and the third computing system so that the first computing system does not display the electronic messages sent by the third computing system to the second computing system based on the electronic messages sent by the third computing system to the second computing system being associated with the identifier of the second computing system or of the user of the second computing system.

14. The computing system of claim 9, wherein:

each of the electronic messages sent by the third computing system to the second computing system is associated with the unique identifier of the electronic business document and an identifier of the third system or of a user of the third system; and restricting the first computing system from displaying the electronic messages includes filtering the messages that the second computing system receives from the first computing system and the third computing system so that the first computing system does not display the electronic messages sent by the third computing system to the second computing system based on the electronic messages sent by the third computing system to the second computing system being associated with the identifier of the second computing system or of the user of the second computing system.

* * * * *